US009083192B2

(12) United States Patent
Tinaphong et al.

(10) Patent No.: US 9,083,192 B2
(45) Date of Patent: Jul. 14, 2015

(54) CURRENT SELECTABLE USB CHARGER

(75) Inventors: Prapan Paul Tinaphong, Westfield, IN (US); William Roger Tittle, Indianapolis, IN (US); James K. Rinehart, Indianapolis, IN (US)

(73) Assignee: VOXX International Corporation, Hauppauge, NY (US)

( * ) Notice: Subject to any disclaimer, the term of this patent is extended or adjusted under 35 U.S.C. 154(b) by 325 days.

(21) Appl. No.: 13/542,828

(22) Filed: Jul. 6, 2012

(65) Prior Publication Data

US 2013/0175977 A1 Jul. 11, 2013

Related U.S. Application Data

(60) Provisional application No. 61/571,878, filed on Jul. 7, 2011.

(51) Int. Cl.
*H02J 7/00* (2006.01)
(52) U.S. Cl.
CPC ....... *H02J 7/0052* (2013.01); *H02J 2007/0062* (2013.01)
(58) Field of Classification Search
USPC .......................................................... 320/107
See application file for complete search history.

(56) References Cited

U.S. PATENT DOCUMENTS

| 2,636,096 | A | 4/1953 | Di Blasi ........................ 337/189 |
| D195,463 | S | 6/1963 | Tamarin ..................... D13/137.4 |
| 4,960,384 | A | 10/1990 | Singer et al. .................. 439/155 |
| D312,615 | S | 12/1990 | Schwartz ..................... D13/139 |
| D316,484 | S | 4/1991 | Kounis et al. ................... D3/104 |
| 5,313,152 | A | 5/1994 | Wozniak et al. .................... 320/6 |
| D348,775 | S | 7/1994 | Scheid ............................ D3/218 |
| 5,327,065 | A | 7/1994 | Bruni et al. ......................... 320/2 |
| D350,938 | S | 9/1994 | Rossman et al. ............. D13/139 |
| D357,460 | S | 4/1995 | Lovett .......................... D13/143 |
| D361,315 | S | 8/1995 | Wedell et al. ................ D13/160 |
| 5,619,578 | A | 4/1997 | Sondermeyer et al. ......... 381/61 |
| D379,160 | S | 5/1997 | Johansson et al. ........... D11/216 |

(Continued)

OTHER PUBLICATIONS

Notification of Transmittal of the International Search Report and the Written Opinion of the International Searching Authority, or the Declaration (in English) dated Oct. 5, 2012, International Search Report (in English) dated Oct. 5, 2012 and Written Opinion of the International Searching Authority (in English) dated Oct. 5, 2012, each of the above being issued by the U.S. Receiving Office (PTO).

(Continued)

*Primary Examiner* — Drew A Dunn
*Assistant Examiner* — Harry O'Neill-Becerril
(74) *Attorney, Agent, or Firm* — Gerald T. Bodner

(57) ABSTRACT

A current selectable USB charger includes a USB (universal serial bus) connector, a crossover switch, a pair of voltage dividers and a power supply. The power supply provides preferably a +5 volt DC voltage to the pair of voltage dividers. The pair of voltage dividers includes a first voltage divider and a second voltage divider, each being formed of a pair of series-connected resistors. The voltage on the junction of the series-connected resistors of the first voltage divider is selectively provided, through the crossover switch, to one of the D− pin and the D+ pin of the USB connector. The voltage on the junction of the series-connected resistors of the second voltage divider is selectively provided, through the crossover switch, to one of the D+ pin and the D− pin of the USB connector.

8 Claims, 4 Drawing Sheets

(56) References Cited

U.S. PATENT DOCUMENTS

| | | | |
|---|---|---|---|
| D401,219 S | 11/1998 | Stekelenburg | D13/137.2 |
| D408,355 S | 4/1999 | Welsh et al. | D13/139.4 |
| 5,923,147 A | 7/1999 | Martensson | 320/111 |
| 5,955,791 A | 9/1999 | Irlander | 307/38 |
| D415,067 S | 10/1999 | Tung | D11/200 |
| D428,327 S | 7/2000 | Stekelenburg | D8/359 |
| D432,499 S | 10/2000 | Stekelenburg | D13/139.6 |
| D434,344 S | 11/2000 | Nezu | D11/216 |
| D440,203 S | 4/2001 | Ewing et al. | D13/137.2 |
| D442,550 S | 5/2001 | Tong et al. | D13/137.2 |
| D447,087 S | 8/2001 | Hodge | D11/200 |
| D461,746 S | 8/2002 | Olson et al. | D11/201 |
| D468,848 S | 1/2003 | Schenck | D26/26 |
| D469,062 S | 1/2003 | Nieto et al. | D13/137.2 |
| 6,510,067 B1 | 1/2003 | Toebes | 363/146 |
| D477,792 S | 7/2003 | Kaneko et al. | D11/200 |
| 6,614,206 B1 | 9/2003 | Wong et al. | 320/136 |
| D481,357 S | 10/2003 | Stekelenburg | D13/139.8 |
| D483,724 S | 12/2003 | Wu | D13/139.7 |
| D486,126 S | 2/2004 | Aromin | D13/137.2 |
| D495,657 S | 9/2004 | Lee | D13/137.2 |
| 6,790,062 B1 | 9/2004 | Liao | 439/171 |
| 6,821,134 B2 | 11/2004 | Chen | 439/131 |
| 6,960,727 B2 | 11/2005 | Hering | 174/135 |
| D514,067 S | 1/2006 | Lee | D13/137.2 |
| 7,050,285 B2 | 5/2006 | Sato et al. | 361/119 |
| 7,140,922 B2 | 11/2006 | Luu et al. | 439/136 |
| 7,170,259 B2 * | 1/2007 | Veselic | 320/114 |
| 7,212,420 B2 | 5/2007 | Liao | 363/146 |
| 7,303,416 B1 | 12/2007 | Liao et al. | 439/173 |
| D567,708 S | 4/2008 | Jallen | D11/200 |
| D568,785 S | 5/2008 | Yang et al. | D11/218 |
| D582,346 S | 12/2008 | Zhou | D13/137.2 |
| D586,691 S | 2/2009 | Snell | D11/214 |
| D588,065 S | 3/2009 | Wadsworth et al. | D13/137.2 |
| 7,520,783 B2 | 4/2009 | Chou et al. | 439/652 |
| D606,545 S | 12/2009 | Salmon | D14/434 |
| D616,817 S | 6/2010 | Walker et al. | D13/119 |
| D618,175 S | 6/2010 | Shi | D13/137.2 |
| D619,535 S | 7/2010 | Shi | D13/137.2 |
| 7,824,051 B2 | 11/2010 | Walter et al. | 362/101 |
| 7,997,925 B2 | 8/2011 | Lam et al. | 439/535 |
| 8,072,183 B2 | 12/2011 | Griffin, Jr. | 320/107 |
| D651,974 S | 1/2012 | Benedetti | D13/137.2 |
| 8,358,100 B2 * | 1/2013 | Helfrich | 320/106 |
| 2004/0121648 A1 | 6/2004 | von Voros | 439/535 |
| 2005/0041827 A1 | 2/2005 | Wu | 381/323 |
| 2007/0108938 A1 | 5/2007 | Veselic | 320/111 |
| 2007/0273325 A1 | 11/2007 | Krieger et al. | 320/106 |
| 2007/0285053 A1 | 12/2007 | Noguchi et al. | 320/114 |
| 2008/0012536 A1 | 1/2008 | Glass | 320/165 |
| 2008/0073117 A1 | 3/2008 | Misener | 174/535 |
| 2008/0111522 A1 | 5/2008 | Simpson et al. | 320/162 |
| 2008/0140887 A1 | 6/2008 | Gallant et al. | 710/110 |
| 2008/0150480 A1 | 6/2008 | Navid | 320/113 |
| 2008/0157715 A1 | 7/2008 | Rosenboom et al. | |
| 2008/0164845 A1 | 7/2008 | Choi | 320/115 |
| 2008/0174265 A1 | 7/2008 | Toya | 320/107 |
| 2008/0183909 A1 | 7/2008 | Lim et al. | 710/14 |
| 2008/0231233 A1 | 9/2008 | Thornton | 320/137 |
| 2009/0015198 A1 | 1/2009 | Brandenburg | 320/115 |
| 2009/0284219 A1 | 11/2009 | Meek | 320/107 |
| 2009/0301927 A1 | 12/2009 | Fvlbrook et al. | 206/564 |
| 2010/0029109 A1 | 2/2010 | Lam et al. | 439/136 |
| 2010/0090528 A1 | 4/2010 | Makwinski | 307/31 |
| 2010/0201308 A1 * | 8/2010 | Lindholm | 320/107 |
| 2010/0219790 A1 | 9/2010 | Chadbourne et al. | 320/107 |
| 2011/0016334 A1 | 1/2011 | Tom et al. | 713/300 |
| 2011/0029703 A1 | 2/2011 | Huo et al. | 710/110 |
| 2011/0050164 A1 | 3/2011 | Partovi et al. | 320/108 |
| 2011/0084660 A1 | 4/2011 | McSweyn | 320/111 |
| 2011/0276734 A1 | 11/2011 | Helfrich | 710/105 |
| 2012/0119695 A1 | 5/2012 | Pin | 320/107 |
| 2012/0169272 A1 | 7/2012 | Khalepari | 320/107 |
| 2012/0258632 A1 | 10/2012 | Lee et al. | 439/660 |
| 2013/0175992 A1 | 7/2013 | Tinaphong et al. | 320/111 |
| 2013/0176738 A1 | 7/2013 | Tinaphong et al. | 362/253 |
| 2013/0260613 A1 | 10/2013 | Misener | 439/653 |
| 2014/0104805 A1 | 4/2014 | Row et al. | 361/807 |

OTHER PUBLICATIONS

Related U.S. Appl. No. 13/736,140, filed Jan. 8, 2013.
Related U.S. Appl. No. 13/736,244, filed Jan. 8, 2013.

* cited by examiner

CURRENT SELECTABLE USB CHARGER

CROSS-REFERENCE TO RELATED APPLICATIONS

This application is related to U.S. Provisional Application Ser. No. 61/571,878, filed on Jul. 7, 2011, and entitled "Current Selectable USB Charger", the disclosure of which is incorporated herein by reference and on which priority is hereby claimed.

BACKGROUND OF THE INVENTION

1. Field of the Invention

The present invention relates to devices for charging electrical equipment, such as cellular telephones, computers, personal music players and the like.

2. Description of the Prior Art

Electronic devices, including cellular telephones and personal electronic devices, such as the iPad™ and iPod™ products, require device specific chargers to recharge their internal batteries. For example, some devices require a 2.1 ampere current to recharge, while others require a one (1) ampere current. As such, chargers are frequently not interchangeable, requiring each electronic device to have a specific charger.

Many electronic devices utilize a USB (universal serial bus) connector and cable to charge their internal batteries. When the charger is connected to the electronic device, the device senses the capabilities of the charger connected thereto by determining the voltage at the D+ and D− pins on the USB connector. Charging devices commonly set the D+ and D− pins of their connectors to specific relative values to indicate the capabilities of the charger. For example, a charger in which the D+ pin is set to a relative low of 2 volts and the D− pin is set to a relative high of 2.7 volts would be indicating that it is capable of charging at a relatively low current, such as 1 ampere. Similarly, a charger in which the D+ pin is set to a relative high of 2.7 volts and the D− pin is set to a relative low of 2 volts would be indicating that it is capable of charging at a relatively high current, such as 2.1 amperes. If the device determines that the charger is only capable of supplying an inappropriate current, the device may not be compatible with the charger and may not accept the charge. For example, an iPod™ device usually requires a charger that supplies a 1 ampere current. If an iPod™ device is connected to a charger that identifies itself by the relative voltages on the D+ and D− pins as being capable of supplying a 2.1 ampere current, the iPod™ device may not accept the charge. As such, it is necessary for a user to use device-specific chargers to charge personal electronic devices. To overcome this problem, some universal chargers have two USB connectors for charging at either 2.1 amperes on one connector or 1 ampere on the other connector.

The present invention provides a novel charging device that overcomes the inherent disadvantages of the conventional charging devices.

OBJECTS AND SUMMARY OF THE INVENTION

It is an object of the present invention to provide a charger for an electronic device which can selectively indicate to the electronic device different current capabilities of the charger.

It is another object of the present invention to provide a current selectable charger connected to a USB (universal serial bus) connector having a D+ pin and a D− pin thereon and which selectively provides different voltages on the D+ and D− pins of the USB connector.

It is still another object of the present invention to provide a current selectable USB charger which has current limiting capabilities.

It is yet a further object of the present invention to provide a current selectable USB charging circuit which overcomes the inherent disadvantages of conventional USB charging circuits.

In accordance with one form of the present invention, a current selectable USB charger includes a USB (universal serial bus) connector, a crossover switch, a pair of voltage dividers and a power supply. The power supply provides preferably a +5 volt DC voltage to the pair of voltage dividers. Preferably, the pair of voltage dividers includes a first voltage divider and a second voltage divider, each being formed of a pair of series-connected resistors. The voltage on the junction of the series-connected resistors of the first voltage divider is selectively provided, through the crossover switch, to one of the D− pin and the D+ pin of the USB connector. The voltage on the junction of the series-connected resistors of the second voltage divider is selectively provided, through the crossover switch, to one of the D+ pin and the D− pin of the USB connector.

The crossover switch is switchable between at least a first state, in which it provides the voltage on the junction of the series-connected resistors of the first voltage divider to the D− pin and the voltage on the junction of the series-connected resistors of the second voltage divider to the D+ pin of the USB connector, and a second state, in which it provides the voltage on the junction of the series-connected resistors of the first voltage divider to the D+ pin and the voltage on the junction of the series-connected resistors of the second voltage divider to the D− pin.

These and other objects, features and advantages of the present invention will be apparent from the following detailed description of illustrative embodiments thereof, which is to be read in connection with the accompanying drawings.

DETAILED DESCRIPTION OF THE PREFERRED EMBODIMENTS

Figure 1:
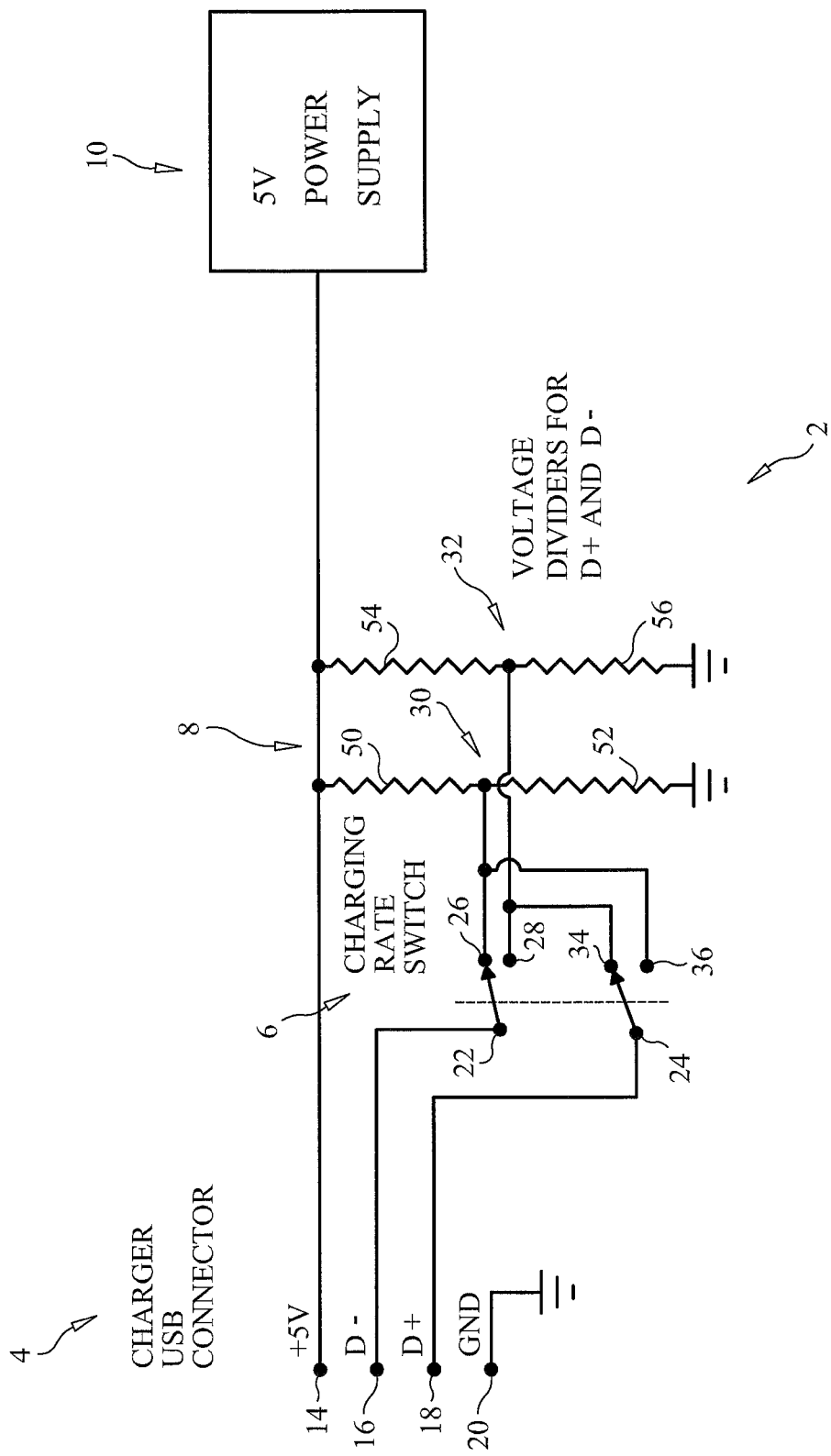
FIG. 1 is schematic block diagram of the charger formed in accordance with a first embodiment of the present invention.

As can be seen in FIG. 1 of the drawings, in its simplest form, the charger 2 formed in accordance with a first embodiment of the present invention includes at least one connector 4 (preferably a USB connector), a crossover switch 6, a pair of voltage dividers 8 and a power supply 10.

The at least one connector of the charger preferably includes a plurality of pins including at least one power pin 14 (on which is preferably +5 volts DC) which is used for charging an external electronic device connected to the charger, a D− pin 16, a D+ pin 18 and a ground pin 20. The charger is electrically connected to a personal or other type of electronic device by extending a USB cable or the like between the connector 4 of the charger 2 and the mating connector of the electronic device.

A crossover switch 6 in electrical communication with the pair of voltage dividers 8 is included to alternate the voltages at the D− pin 16 and the D+ pin 18 so that a plurality of electronic devices may be compatible with and utilize the charger 2. More specifically, referring to FIG. 1 of the drawings, it can be seen that the crossover switch 6 is preferably constructed as a double pole, double throw switch formed of first and second sections which are ganged together. The first wiper or common contact 22 of the first section of the switch 6 is in electrical communication with the D− pin 16 of the connector 4, and the second wiper or common contact 24 of the second section of the switch 6 is in electrical communication with the D+ pin 18 of the connector 4. The first output contact 26 of the first section of the switch 6 is in electrical communication with a first voltage divider 30. The second output contact 28 of the first section of the switch 6 is in electrical communication with a second voltage divider 32. The first output contact 34 of the second section of the switch 6 is in electrical communication with the second voltage divider 32. The second output contact 36 of the second section of the switch 6 is in electrical communication with the first voltage divider 30. A power supply 10 (preferably generating +5 volts DC) is in electrical communication with the power pin 14 of the charger connector 4 to provide power to charge the electronic device connected thereto.

The first voltage divider 30 preferably includes a first resistor 50 and a second resistor 52 connected in series to the first resistor 50. One end of the first resistor 50 is connected to the +5 volt DC output of the power supply 10. One end of the second resistor 52 is connected to ground. The junction defined by the interconnected ends of the first and second resistors 50, 52 is connected to the first output contact 26 of the first section of the switch 6 and the second output contact 36 of the second section of the switch 6.

Similarly, the second voltage divider 32 preferably includes a first resistor 54 and a second resistor 56 connected in series to the first resistor 54. One end of the first resistor 54 is connected to the +5 volt DC output of the power supply 10. One end of the second resistor 56 is connected to ground. The junction defined by the interconnected ends of the first and second resistors 54, 56 is connected to the second output contact 28 of the first section of the switch 6 and the first output contact 34 of the second section of the switch 6.

By selecting the values of the pairs of interconnected resistors 50, 52 and 54, 56, the first voltage divider 30 preferably provides an output voltage at its resistor junction of one of +2 volts DC and +2.7 volts DC, and the second voltage divider 32 preferably provides an output voltage at its resistor junction of the other of +2 volts DC and +2.7 volts DC.

In a first switch position of the crossover switch 6, the D− pin 16 on the charger connector 4 is set to the output voltage of the first voltage divider 30 and the D+ pin 18 is set to the output voltage of the second voltage divider 32. By switching the crossover switch 6 to a second position, the voltages at the D− pin 16 and the D+ pin 18 are swapped, as the D− pin 16 is now set to the output voltage of the second voltage divider 32 and the D+ pin 18 is set to the output voltage of the first voltage divider 30.

Conventionally, when a rechargeable electronic device is connected to a standard charger, many devices will only accept charge if the voltages at the D− pin and the D+ pin, corresponding to the specific output charging current of the charger, match the charging specification of the electronic device. For example, some devices require that the D− pin have a relative high voltage value such as 2.7 volts and the D+ pin have a relative low voltage value such as 2 volts. Alternatively, some devices require that the D− pin have a relative low voltage value such as 2 volts and the D+ pin have a relative high voltage value such as 2.7 volts. As such, although the charger may be capable of supplying sufficient current to the electronic device, the device may not accept charge from the charger unless the relative voltages match the device's specifications.

The crossover switch 6 and voltage dividers 30, 32 in electrical communication therewith allow the relative voltages on the D− and D+ pins 16, 18 to be swapped so that the charger 2 may be selectively adapted to meet the charging specifications of the electronic device connected thereto. For example, an iPad™ personal electronic device utilizes a charger supplying a current of about 2.1 amperes. When the iPad™ device is connected to the charger 2, the device evaluates the voltages at the D− and D+ pins 16, 18 to verify that a proper charger is connected thereto. If the D− pin 16 is set to a relative low voltage such as 2 volts, and the D+ pin 18 is set to a relative high voltage such as 2.7 volts, corresponding to a charger having approximately a 2.1 ampere supply current matching the specification of the iPad™ device, the device will be compatible with the charger 2 and accept charge from the charger to charge its internal battery. However, if the voltages at the D− and D+ pins 16, 18 are a relative high such as 2.7 volts and a relative low such as 2 volts, respectively, the iPad™ device will not accept charge from the charger 2 and will not allow the charger to charge the battery of the device. To reconfigure the voltages at the D− and D+ pins 16, 18 without the need to change chargers or connectors, the position of the crossover switch 6 of the charger 2 of the present invention may be changed to swap the relative voltages at the D− and D+ pins 16, 18, thereby matching the relative voltages at the pins to the specifications of the iPad™ device so that the iPad™ device will accept charge from the charger 2 to charge its internal battery. As long as the charger 2 can provide sufficient current, for example, three (3) amperes, on the power pin 14 of the connector 4 to meet the charging requirements of the electronic device to which it is connected, it will charge the internal battery of the electronic device.

Figure 2:
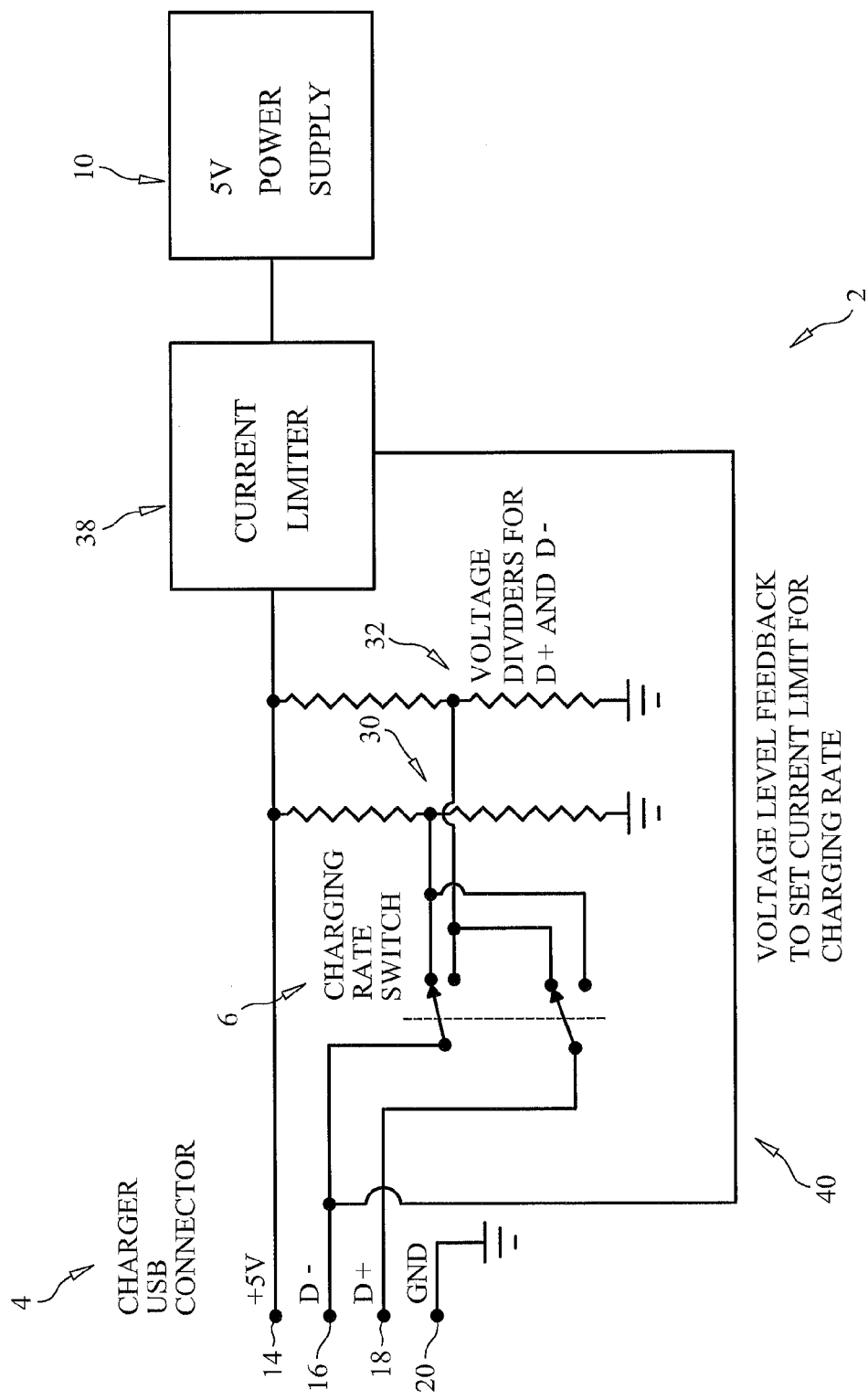
FIG. 2 is schematic block diagram of the charger formed in accordance with a second embodiment of the present invention, showing the voltage level feedback circuit connected to the D− pin.
Figure 3:
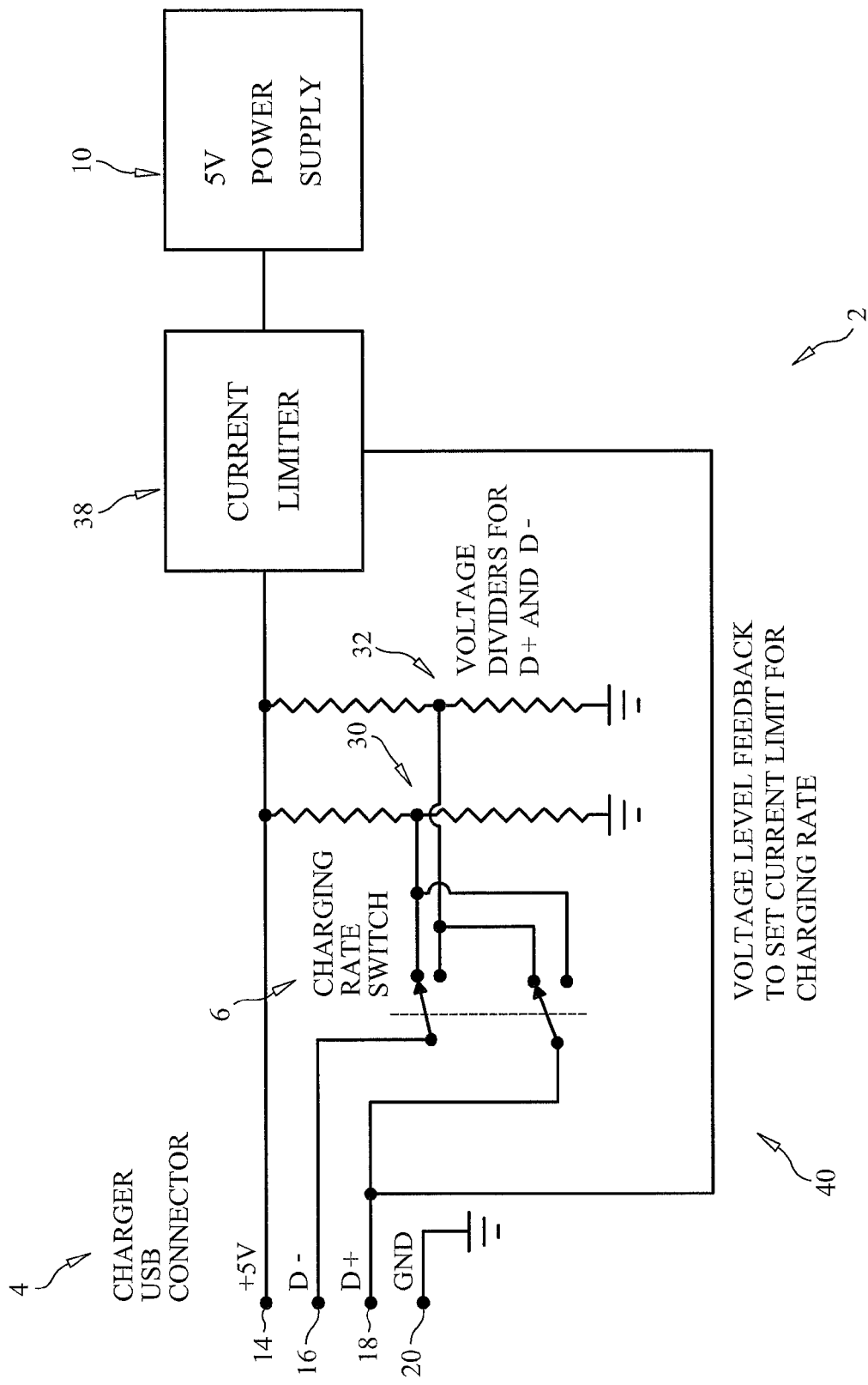
FIG. 3 is schematic block diagram of the charger formed in accordance with an alternative version of the second embodiment of the present invention, showing the voltage level feedback circuit connected to the D+ pin.

As can be seen in FIGS. 2 and 3 of the drawings, the charger 2 formed in accordance with a second embodiment of the present invention further includes at least one current limiter circuit 38 and voltage level feedback circuit 40. The current limiter circuit 38 is electrically connected to the power supply 10 and controls, in response to signals sent by the voltage level feedback circuit 40, the current supplied to the power pin 14 of the connector 4 and electronic device electrically connected thereto.

More specifically, certain rechargeable electronic devices may accept high speed, high current recharges while others only accept low current recharges. For example, the iPod™ device requires a low current recharge, such as a one (1) ampere current, while the iPad™ device accepts a high speed, high current recharge, such as a 2.1 ampere current. The power supply 10 formed in accordance with the present invention is preferably constructed to be capable of providing a high current charge, such as three (3) amperes. However, the high current should be regulated to supply the appropriate current to a variety of devices, such as the low current iPod™ device and the high current iPad™ device. Accordingly, the power supply 10 is electrically connected to the current limiter circuit 38 that is controlled by the voltage feedback circuit 40 in electrical communication with either the D− pin 16, as shown in FIG. 2, or the D+ pin 18 as shown in FIG. 3.

Even more specifically, and as shown in FIG. 2, the feedback circuit 40 interconnects the D− pin 16 of the connector 4 and first wiper or common contact 22 of the crossover switch 6 with a current control input on the current limiter circuit 38 to control the output current of the current limiter circuit 38 to a specified current, such as one (1) ampere or 2.1 amperes, for example, provided on the +5 volt charging pin 14 of the connector 4. Similarly, in FIG. 3, the feedback circuit 40 interconnects the D+ pin 18 of the connector 4 and the second wiper or common contact 24 of the crossover switch 6 with the current control input of the current limiter circuit 38 to control the output current of the current limiter circuit 38 to a specified current (one ampere or 2.1 amperes, for example) that is provided on the +5 volt charging pin 14 of the connector 4.

When the voltages at the D− pin 16 and the D+ pin 18 are set to voltages corresponding to a low current charge by the crossover switch 6, the voltage feedback circuit 40 connected thereto directs the current limiter circuit 38 to supply a low current to the power pin 14 and electronic device connected thereto. Similarly, when the voltages at the D− pin 16 and the D+ pin 18 are set to voltages corresponding to a high current charge by the crossover switch 6, the voltage feedback circuit 40 connected thereto directs the current limiter circuit 38 to supply a high current to the power pin 14 and electronic device connected thereto.

Figure 4:
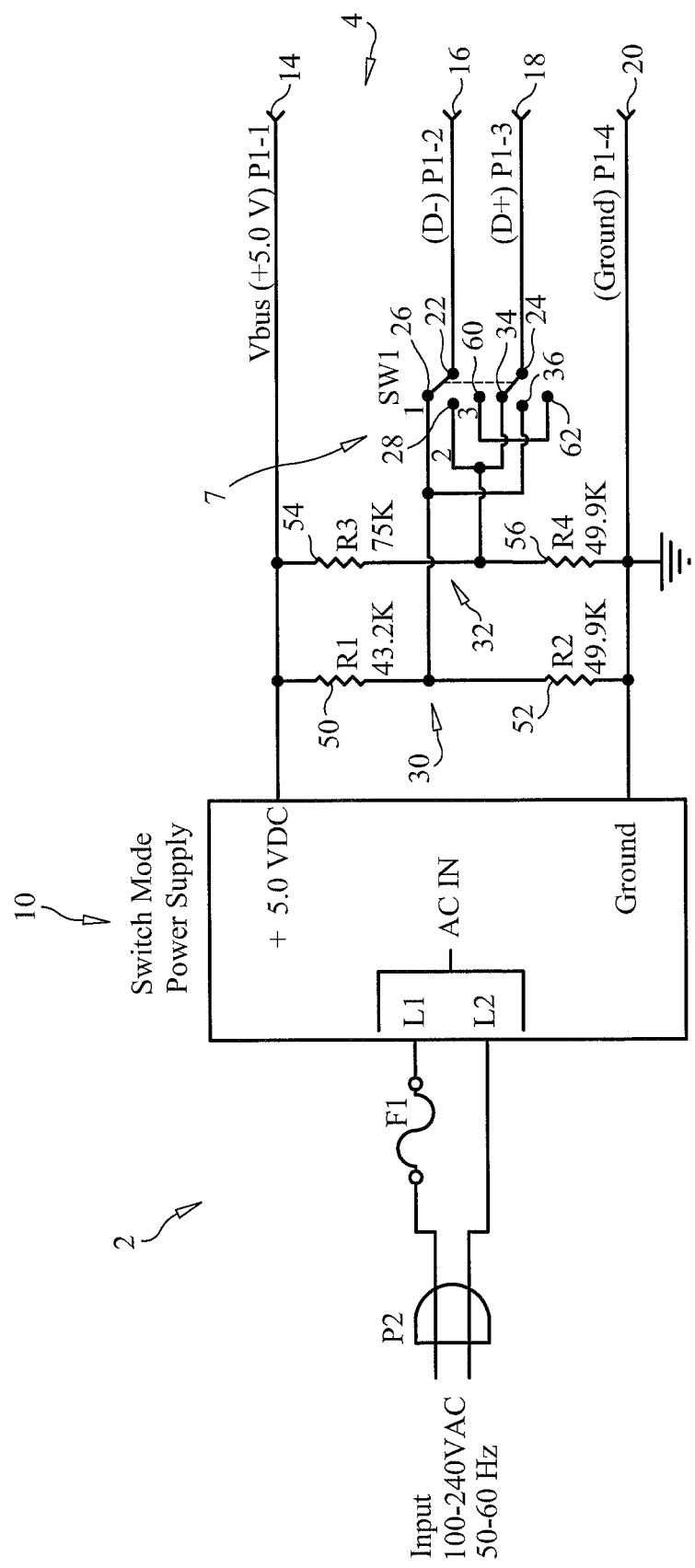
FIG. 4 is schematic block diagram of the charger formed in accordance with a third embodiment of the present invention.

As can be seen in FIG. 4 of the drawings, the charger 2 formed in accordance with a third embodiment of the present invention may further include a three-way crossover switch 7, which adds to the previously described crossover switch 6 a third position that shorts together the D+ and D− pins 16, 18, thereby matching the charging specifications of a Blackberry Playbook™ device, thus allowing the Playbook™ device to accept charge from the charger 2 to recharge its internal battery.

More specifically, with respect to the embodiment shown in FIG. 4, the three-way crossover switch 7 is formed as a double pole, triple throw switch. As in the previous embodiments shown in FIGS. 1-3, the first wiper or common contact 22 of the first section of the switch 7 is connected to the D− pin 16 of the charger connector 4. Also, the second wiper or common contact 24 of the second section of the switch 7 is, as before, connected to the D+ pin 18 of the charger connector 4. The first output contact 26 of the first section of the switch 7 is connected to the resistor junction of the first voltage divider 30, as also shown in FIGS. 1-3, and the second output contact 28 of the first section of the switch 7 is connected to the resistor junction of the second voltage divider 32, as in the previous embodiments.

As also in the previous embodiments, the first output contact 34 of the second section of the switch 7 is connected to the resistor junction of the second voltage divider 32, and the second output contact 36 of the second section of the switch 7 is connected to the resistor junction of the first voltage divider 30.

The third output contact 60 of the first section of the switch 7 is connected to the third output contact 62 of the second section of the switch 7, and these third contacts 60, 62 are not connected to either voltage divider 30, 32 and are, in essence, floating, at least when the connector 4 is not connected to an external electronic device. Thus, for applications where the charger 2 is envisioned to charge a Blackberry Playbook™ device, the switch 7 is moved into its third position where an electrical circuit is made between the first wiper or common contact 22 and the third output contact 60 of the first section of the switch 7, and between the second wiper or common contact 24 and the third output contact 62 of the second section of the switch 7, so that the D− pin 16 and the D+ pin 18 on the charger connector 4 are provided with no voltages from voltage dividers 30, 32. Then, the Blackberry Playbook™ device will be compatible with the charger 2 of the present invention and accept charge from the charger 2, which is capable of providing at least 1.8 amperes of current to charge the Playbook™ device.

As also shown in FIG. 4 of the drawings, preferably the first voltage divider 30 includes first resistor 50 (R1), having a value of 43.2 K ohms, and second resistor 52 (R2), having a value of 49.9 K ohms. Furthermore, preferably the second voltage divider 32 includes a first resistor 54 (R3), having a value of 75 K ohms, and a second resistor 56 (R4), having a value of 49.9 K ohms. Such values of the resistors 50-54 (R1-R4), when the voltage dividers 30, 32 are connected between a +5 volt DC source and ground, will provide the desired 2 volts and 2.7 volts on either the D− pin 16 or the D+ pin 18 of the charger connector 4.

Thus, it is envisioned to be within the scope of the present invention to include a charger 2 with a crossover switch having a plurality of positions to adapt the charger formed in accordance with the present invention to charge a variety of devices.

Thus, to summarize some of the aspects of the present invention, a current selectable USB charger 2 includes a universal serial bus (USB) connector 4, the USB connector 4 having a D+ pin 18 and a D− pin 16, a crossover switch 6 electrically coupled to the D+ pin 18 and the D− pin 16 of the USB connector 4, at least a first voltage divider 30 and a second voltage divider 32, the at least first voltage divider 30 and the second voltage divider 32 being electrically coupled to the crossover switch 6, and a power supply 10, the power supply 10 generating a power supply voltage, the power supply 10 being electrically coupled to the at least first voltage divider 30 and the second voltage divider 32 and providing the power supply voltage to the at least first voltage divider 30 and the second voltage divider 32.

The crossover switch 6 may be a double pole, double throw switch, or a double pole, triple throw switch, or another form of a switch.

The first voltage divider 30 preferably includes a first resistor 50 and a second resistor 52. The first and second resistors 50, 52 are connected together in series to define a first electrical junction having a first voltage thereon. The second voltage divider 32 preferably includes a third resistor 54 and a fourth resistor 56. The third and fourth resistors 54, 56 are connected together in series to define a second electrical junction having a second voltage thereon.

The first electrical junction of the first voltage divider 30 is electrically coupled to the crossover switch 6, and the second electrical junction of the second voltage divider 32 is also electrically coupled to the crossover switch 6. Thus, the first voltage divider 30 and the second voltage divider 32 respectively provide the first voltage and the second voltage to the crossover switch 6.

Even more preferably, the crossover switch 6 includes a first pole circuit having a first common contact 22, a first output contact 26 and a second output contact 28, and a second pole circuit having a second common contact 24, a third output contact 34 and a fourth output contact 36. The first voltage divider provides the first voltage to the first output contact 26 of the first pole circuit and to the fourth output contact 36 of the second pole circuit. The second voltage divider 32 provides the second voltage to the second output contact 28 of the first pole circuit and to the third output contact 34 of the second pole circuit. The first common contact 22 of the first pole circuit is electrically coupled to the D− pin 16 of the USB connector 4, and the second common contact 24 of the second pole circuit is electrically coupled to the D+ pin 18 of the USB connector 4.

In the above embodiment of the present invention, the crossover switch 6 is switchable between at least a first state and a second state. Accordingly, the crossover switch 6 provides the first voltage to the D− pin 16 and the second voltage to the D+ pin 18 of the USB connector 4 when the switch 6 is in the first state, and provides the first voltage to the D+ pin 18 and the second voltage to the D− pin 16 of the USB connector 4 when the switch 6 is in the second state.

In another embodiment of the present invention, the crossover switch 7 of the current selectable USB charger 2 is switchable to a third state (see FIG. 4). Also, preferably, the first pole circuit of the crossover switch 7 includes a fifth output contact 60 and the second pole circuit includes a sixth output contact 62. The first voltage is not provided to the fifth output contact 60 of the first pole circuit and the sixth output contact 62 of the second pole circuit, and the second voltage is not provided to the fifth output contact 60 of the first pole circuit and the sixth output contact 62 of the second pole circuit. Accordingly, when the crossover switch 7 is in the third state, the crossover switch 7 does not provide the first voltage to the D− pin 16 and the second voltage to the D+ pin 18 of the USB connector 4, and also does not provide the first voltage to the D+ pin 18 and the second voltage to the D− pin 16 of the USB connector 4 when the switch 7 is in the third state.

In another preferred form of the present invention, the current selectable USB charger 2 further includes a current limiter 38 (see FIGS. 2 and 3). The current limiter 38 is electrically coupled to the power supply 10. The current selectable USB charger 2 also preferably includes a feedback circuit 40. The feedback circuit 40 is electrically coupled to the current limiter 38 and to the USB connector 4.

Even more preferably, the feedback circuit 40 is electrically coupled to the D− pin 16 of the USB connector 4 (see FIG. 2). In this embodiment, the current limiter 38 includes a current control input, the feedback circuit 40 being electrically coupled to the current control input. The feedback circuit 40 provides a voltage on the D− pin 16 of the USB connector 4 to the current control input of the current limiter 38. The current limiter 38 controls a current associated with the power supply voltage to a predetermined first current in response to the voltage on the D− pin 16 of the USB connector 4.

Alternatively, the feedback circuit 40 of the current selectable USB charger 2 is electrically coupled to the D+ pin 18 of the USB connector 4 (see FIG. 3). In this embodiment, the feedback circuit 40, being electrically coupled to the current control input, provides a voltage on the D+ pin 18 of the USB connector 4 to the current control input of the current limiter 38. The current limiter 38 controls the current associated with the power supply voltage to a predetermined second current in response to the voltage on the D+ pin 18 of the USB connector 4.

The charger 2 formed in accordance with the present invention provides a selectable charge current to accommodate a host of rechargeable electronic devices, limiting the need for device specific chargers or a charger with multiple connectors. The charger 2 may be connected to the electronic device and the appropriate charging current may be selected by manipulating the crossover switch 6.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A current selectable USB charger, which comprises:
a universal serial bus (USB) connector, the USB connector having a D+ pin and a D− pin;
a crossover switch electrically coupled to the D+ pin and the D− pin of the USB connector;
at least a first voltage divider and a second voltage divider, the at least first voltage divider and the second voltage divider being electrically coupled to the crossover switch; and
a power supply, the power supply generating a power supply voltage, the power supply being electrically coupled to the at least first voltage divider and the second voltage divider and providing the power supply at least first voltage divider and the second voltage divider;
wherein the first voltage divider includes a first resistor and a second resistor, the first and second resistors being connected together in series to define a first electrical junction having a first voltage thereon, and wherein the second voltage divider includes a third resistor and a fourth resistor, the third and fourth resistors being connected together in series to define a second electrical junction having a second voltage thereon, the first electrical junction of the first voltage divider being electrically coupled to the crossover switch, the second electrical junction of the second voltage divider being electrically coupled to the crossover switch, the first voltage divider and the second voltage divider respectively providing the first voltage and the second voltage to the crossover switch;
wherein the crossover switch includes a first pole circuit having a first common contact, a first output contact and a second output contact, and a second pole circuit having a second common contact, a third output contact and a fourth output contact, the first voltage divider providing the first voltage to the first output contact of the first pole circuit and to the fourth output contact of the second pole circuit, the second voltage divider providing the second voltage to the second output contact of the first pole circuit and to the third output contact of the second pole circuit, the first common contact of the first pole circuit being electrically coupled to the D− pin of the USB connector, the second common contact of the second pole circuit being electrically coupled to the D+ pin of the USB connector;
wherein the crossover switch is switchable between at least a first state and a second state; and
wherein the crossover switch provides the first voltage to the D− pin and the second voltage to the D+ pin of the USB connector when the switch is in the first state, and provides the first voltage to the D+ pin and the second voltage to the D− pin of the USB connector when the crossover switch is in the second state.

2. A current selectable USB charger as defined by claim 1, wherein the crossover switch is a double pole, double throw switch.

3. A current selectable USB charger as defined by claim 1, wherein the crossover switch is a double pole, triple throw switch.

4. A current selectable USB charger as defined by claim 1, wherein the crossover switch is switchable to a third state; and
wherein the crossover switch does not provide the first voltage to the D− pin and the second voltage to the D+ pin of the USB connector when the switch is in the third state, and does not provide the first voltage to the D+ pin and the second voltage to the D− pin of the USB connector when the switch is in the third state.

5. A current selectable USB charger as defined by claim 1, wherein the crossover switch is switchable to a third state;

wherein the first pole circuit includes a fifth output contact and the second pole circuit includes a sixth output contact, the first voltage not being provided to the fifth output contact of the first pole circuit and the sixth output contact of the second pole circuit, and the second voltage not being provided to the fifth output contact of the first pole circuit and the sixth output contact of the second pole circuit; and wherein the crossover switch does not provide the first voltage to the D− pin and the second voltage to the D+ pin of the USB connector when the switch is in the third state, and does not provide the first voltage to the D+ pin and the second voltage to the D− pin of the USB connector when the switch is in the third state.

6. A current selectable USB charger as defined by claim 1, which further comprises:

a current limiter, the current limiter being electrically coupled to the power supply; and a feedback circuit, the feedback circuit being electrically coupled to the current limiter and to the USB connector.

7. A current selectable USB charger as defined by claim 6, wherein the feedback circuit is electrically coupled to the D− pin of the USB connector; and wherein the current limiter includes a current control input, the feedback circuit being electrically coupled to the current control input, the feedback circuit providing a voltage on the D− pin of the USB connector to the current control input of the current limiter, the current limiter controlling a current associated with the power supply voltage to a predetermined first current in response to the voltage on the D− pin of the USB connector.

8. A current selectable USB charger as defined by claim 6, wherein the feedback circuit is electrically coupled to the D+ pin of the USB connector; and wherein the current limiter includes a current control input, the feedback circuit being electrically coupled to the current control input, the feedback circuit providing a voltage on the D+ pin of the USB connector to the current control input of the current limiter, the current limiter controlling a current associated with the power supply voltage to a predetermined second current in response to the voltage on the D+ pin of the USB connector.

\* \* \* \* \*